Figure 1:
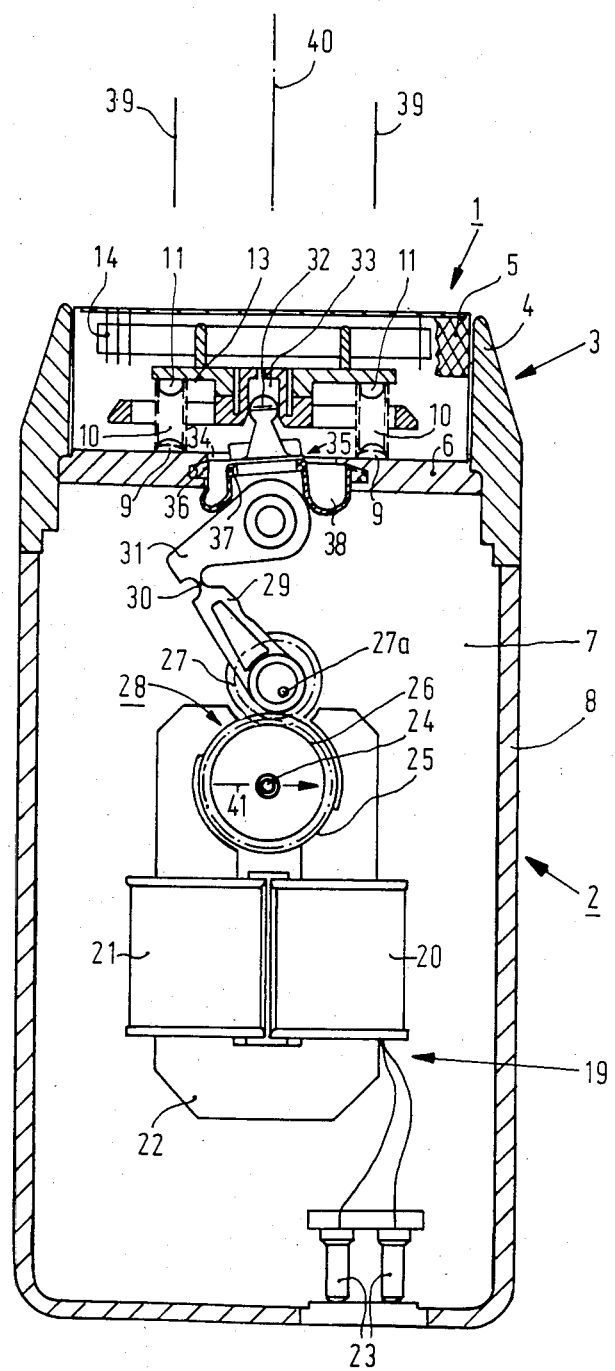

United States Patent [19]

Bertram et al.

[11] Patent Number: 4,628,607
[45] Date of Patent: Dec. 16, 1986

[54] VIBRATION DRY SHAVING APPARATUS DRIVEN BY A BIPOLAR UNIPHASE SYNCHRONOUS MOTOR

[75] Inventors: Leo Bertram, Stolberg, Fed. Rep. of Germany; Hugo Schemmann, Schaesberg, Netherlands; Romuald Bukoschek, Klagenfurt, Austria

[73] Assignee: U.S. Philips Corporation, New York, N.Y.

[21] Appl. No.: 728,720

[22] Filed: Apr. 30, 1985

[30] Foreign Application Priority Data

May 14, 1984 [DE] Fed. Rep. of Germany ....... 3417806

[51] Int. Cl.$^4$ ............................................. B26B 19/12
[52] U.S. Cl. ..................................................... 30/43.92
[58] Field of Search .............................. 30/43.92, 41.5

[56] References Cited

U.S. PATENT DOCUMENTS

| | | | |
|---|---|---|---|
| 2,601,720 | 7/1952 | Carissimi | 30/43.92 |
| 3,714,711 | 2/1973 | Daniels | 30/43.92 |
| 4,038,749 | 8/1977 | Yamada | 30/43.92 |
| 4,240,200 | 12/1980 | Bukoschek | 30/43.92 |
| 4,400,875 | 8/1983 | Buzzi | 30/43.92 |
| 4,549,352 | 10/1985 | Ochiai | 30/41.5 |

Primary Examiner—Jimmy C. Peters
Attorney, Agent, or Firm—Rolf E. Schneider

[57] ABSTRACT

A vibratory dry-shaving apparatus comprises a housing; a bipolar, uniphase, synchronous motor positioned within the housing and having a rotor and a stator; and a shaving head arranged on the housing and including a vibratory cutter part below a fixed cutter part. A wall separates the interior of the housing from the shaving head, such wall having a passage therethrough. A swing lever is driven by the rotor and engages the vibratory cutter part to drive the latter, the swing lever extending through the passage. An elastic sleeve surrounds the swing lever and seals the passage between the edge thereof and the swing lever. The elastic sleeve is asymmetrically designed so that, in a final end position of the vibratory cutter part where the magnetic fields of the rotor and the stator are parallel, no force resulting from deformation of the sleeve is exerted on the vibratory cutter part.

3 Claims, 4 Drawing Figures

VIBRATION DRY SHAVING APPARATUS DRIVEN BY A BIPOLAR UNIPHASE SYNCHRONOUS MOTOR

This invention relates to a vibration-type dry shaving apparatus driven by means of a bipolar, uniphase, synchronous motor and comprising a shaving head arranged on the housing of the apparatus and having below a fixed cutter part a vibratory cutter part which is driven by means of a swing lever passing through a separation wall, the passage being closed by means of an elastic sealing sleeve.

From U.S. Pat. No. 4,400,875 there is known a dry shaver in which a bipolar uniphase synchronous motor is used for reciprocating the cutters of a shaving head. In order to convert the rotary movement of the motor shaft into reciprocatory movement of the cutters a cam roller mechanism is used. The cutters are is urged by means of pressure springs against the foil arching above the cutters. The pressure springs bear at their one end on the foot points fixed to the apparatus and at their other end on contact places of the cutting knife comprising the cutters.

The interior of the housing of the apparatus is separated from the insertable shaving head by a separation wall. The separation wall has, however, a passage for a swing lever, which engages the cutting knife. The interior of the housing is protected against falling cut hair particles and skin scales and other dirt particles by means of a sealing sleeve, which intimately surrounds the swing lever and bears around the edge of its passage on the outside. The sealing sleeve is elastic.

It has been found that with the conventional known sealing sleeves force components can occur which tend to retain the cutting knife in the proximity of either end position thereof.

U.S. Pat. No. 4,400,875 furthermore discloses that the cutting knife should occupy either end position with maximum deflection when the rotor field and the motor field are parallel to one another. In these positions of the cutting knife the friction moment affecting the motor is in general at a minimum and the adhesion moment is capable of turning the rotor out of the position in which the current moment is equal to zero. This automatic turning out at the final position can be rendered difficult by the sealing sleeve, since the elasticity of the sealing sleeve cannot be made infinitely small.

The present invention has for its object to improve such apparatus in that by changing the sealing sleeve the spring forces affecting the cutting knife have a positive influence on the movement from the final position in which the rotor field and the stator field are parallel and hence with a given motor dimension the starting voltage is reduced.

According to the invention this is achieved in that the sealing sleeve is asymmetrically designed in a manner such that in an end position of the vibratory cutting knife in which the magnetic fields of the rotor and the stator are parallel to one another no force components occur from the sealing sleeve on this cutting knife part.

It is in this way ensured that in the end position in which the rotor field and the stator field are parallel the cutting knife is not affected by the sealing sleeve. Therefore, the adhesion moment can become more effective and urge the cutting knife out of the end position.

In a further development of the invention the clamping rim of the sleeve surrounding the swing lever is displaced in the direction of the said end position. By the narrowing of the bellows on the side of the apparatus in the direction of the end position and by the widening of the bellows on the opposite side the force components acting in the direction of said end position are obviated so that the acting adhesion moment can have its full effect.

In a further embodiment of the invention the forces on the swing lever are minimized by raising the elasticity of the bellows of the sealing sleeve, by shaping the sealing sleeve and the material thereof. The forces of the sealing sleeve exerted on the swing lever should overall be minimized.

Figure 2:
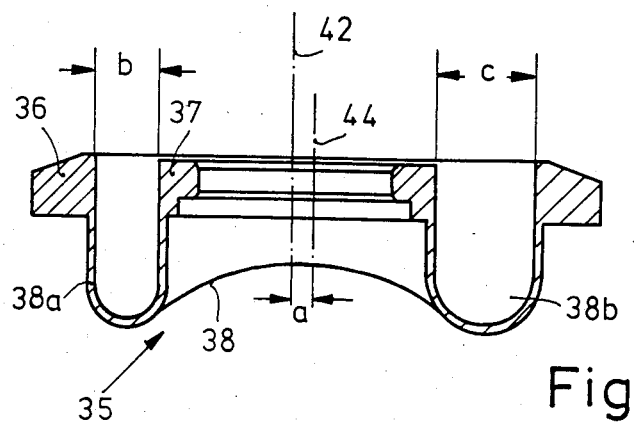
Figure 3:
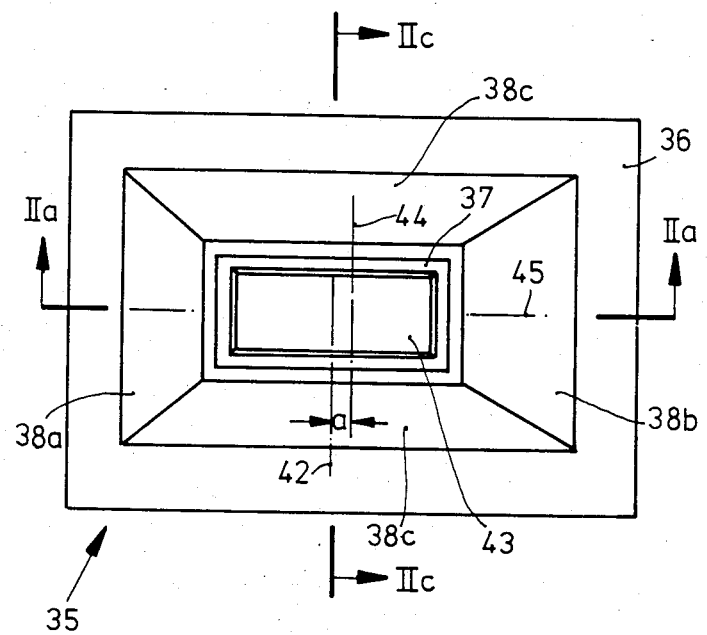
Figure 4:
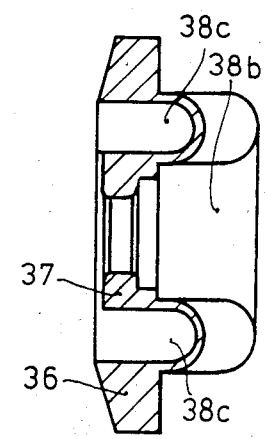

The invention will now be described more fully with reference to the accompanying drawings, in which FIG. 1 shows a dry shaving apparatus driven by means of a uniphase synchronous motor, partly in an open state and partly in a sectional view, the sealing sleeve in the separation wall between the housing of the apparatus and the shaving head being shown on a swing lever passing through the separation wall, FIG. 2 shows on an enlarged scale a partially sectional view taken along line IIa—IIa of FIG. 3 of the sealing sleeve in the separation wall of the shaving apparatus biased toward said one end position, FIG. 3 is a plan view of FIG. 2, and FIG. 4 is a partially sectional view taken along line IIc—IIc of FIG. 3.

The dry shaver 1 shown in FIG. 1 comprises a housing 2 and a shaving head 3 arranged thereon. The shaving head 3 has a shaving head frame 4, in which an arcuate perforated foil 5 is held in a manner not shown in detail. For this purpose the longitudinal rims of the foil 5 may be fastened to hooks of the shaving head frame 4. The housing 2 comprises two housing halves 8, one of which is visible from its inner side.

On the shaving head side the housing 2 is provided with a separation wall 6, which separates the interior 7 of the housing from the shaving head.

On the side of the shaving head the separation wall 6 is provided with foot points 9 serving to hold pressure springs 10. The top ends of the pressure springs 10 bear on supports 11 of a cutting knife 13. The cutting knife 13 has knife blades 14 pressing in arcuate form from below into the vaulted foils.

The cutting knife is driven in a reciprocatory, vibratory manner. For this drive a bipolar, uniphase, synchronous motor 19 is provided, which comprises a stator 22 provided with energizing turns 20, 21. The energizing turns 20 and 21 can be energized through mains contacting pins 23.

The motor shaft 24, carrying a permanent motor 25, is provided with a gear wheel 26 in mesh with a gear wheel 27, forming a transmission drive 28. The gear wheel 27 has an eccentric cam 27a, which engages a driving rod 29. Through a film hinge 30 the driving rod 29 is connected with a swing lever 31, which passes by means of a catching head 32 into a recess 33 of the cutting knife 13.

The swing lever 31 passes through a passage 34 in the separation wall 6. The clearance between the swing lever 31 and the edge of the passage 34 is sealed by a sealing sleeve 35. This sealing sleeve is arranged by means of an outer clamping rim 36 in a groove of the separation wall and is attached by means of an inner clamping rim 37 on the swing lever 31. Between the clamping rims the sleeve forms around the swing lever 31 a U-shaped or gutter-shaped bellows 38.

In the representation shown in FIG. 1 the cutting knife 13 occupies the left-hand end position. In this left hand position the centre lines 39 of the pressure springs are parallel to the centre line 40 of the apparatus. The transverse components of the spring force of the other pressure springs 10 in the direction towards the left-hand end position are thus zero.

The course of the rotor field in the left-hand end position of FIG. 1 is indicated by the arrow 41. This field direction is identical in the end position of the cutting knife 13 shown in FIG. 1 and parallel to the field direction of the stator.

FIG. 2 shows on an enlarged scale the sealing sleeve 35 as a component part relieved from any force exerted thereon. FIGS. 2 and 3 show that the centre line 42 of the opening 43 of the sealing sleeve 35 holding the swing lever is displaced to the left in a direction towards the left-hand end position. The extent of displacement with respect to the theoretical centre line 44 of the sleeve is indicated by a. Within the outer clamping rim 36 the inner clamping rim 37 is thus displaced to the left by a. By this displacement the gutter-shaped or U-shaped bellows 38 around the clamping rim 37 is narrowed on the left-hand bellows side 38a to the value b and is widened on the right-hand bellows side 38b to the value c. From FIG. 3 it is furthermore apparent that the cross-section of the gutter-shaped bellows part 38c is the same on both sides of the centre line 45 in the vibration direction.

In this way a sealing sleeve 35 is obtained, which has in the vibration direction along the line 45 different rigidities on the left-hand side and on the right-hand side. These different rigidities have to be chosen for the construction so that they are as small as possible and, in general, minimize the forces on the swing lever 31.

What is claimed is:

1. A vibratory dry-shaving apparatus, which comprises a housing; a bipolar, uniphase, synchronous motor positioned within the housing and having a rotor and a stator; a shaving head arranged on the housing and including a vibratory cutter part below a fixed cutter part; a wall separating the interior of the housing from the shaving head, said wall having a passage therethrough; a swing lever driven by said motor and engaging the vibratory cutter part to drive the latter, said swing lever extending through said passage; and an elastic sleeve surrounding the swing lever and sealing the passage between the edge thereof and the swing lever; said elastic sleeve being asymmetrically designed so that, in a final end position of the vibratory cutter part where the magnetic fields of the rotor and the stator are parallel, no force resulting from elastic deformation of the sleeve is exerted on the vibratory cutter part.

2. A dry-shaving apparatus according to claim 1, in which the sleeve forms a U-shaped open bellows around the swing lever; said sleeve having an inner clamping rim for attachment to the swing lever and an outer clamping rim for engagement with the edge of the passage, said inner clamping rim being displaceable in a direction toward the outer clamping rim in the final end position of the vibrating cutter part; the profile width of the bellows thereby diminishing at said final end position in accordance with the displacement effected and becoming correspondingly greater in the opposite direction of such displacement.

3. A dry-shaving apparatus according to claim 2, in which the elasticity of the material forming the sleeve is sufficiently high that the forces acting on the swing lever are minimized.

* * * * *